US008708162B2

(12) United States Patent
Shooshtari et al.

(10) Patent No.: US 8,708,162 B2
(45) Date of Patent: *Apr. 29, 2014

(54) POLYMERIC FIBER WEBS WITH BINDER COMPRISING SALT OF INORGANIC ACID

(75) Inventors: Kiarash Alavi Shooshtari, Littleton, CO (US); James Patrick Hamilton, Port Matilda, PA (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 512 days.

This patent is subject to a terminal disclaimer.

(21) Appl. No.: 12/543,607

(22) Filed: Aug. 19, 2009

(65) Prior Publication Data

US 2011/0042303 A1 Feb. 24, 2011

(51) Int. Cl.
*B01D 24/00* (2006.01)
*B32B 27/02* (2006.01)

(52) U.S. Cl.
USPC ........... 210/503; 210/504; 210/505; 210/506; 210/507; 210/508; 210/509; 162/157.1; 162/157.2; 162/164.1; 162/164.5; 162/164.6; 162/166; 442/164; 442/172

(58) Field of Classification Search
None
See application file for complete search history.

(56) References Cited

U.S. PATENT DOCUMENTS

| | | | | |
|---|---|---|---|---|
| 4,524,164 A | * | 6/1985 | Viswanathan et al. | 524/14 |
| 6,194,477 B1 | * | 2/2001 | Cawse et al. | 521/76 |
| 6,627,704 B2 | * | 9/2003 | Yeager et al. | 525/391 |
| 7,655,711 B2 | | 2/2010 | Swift et al. | |
| 2007/0027283 A1 | * | 2/2007 | Swift et al. | 527/312 |
| 2007/0123679 A1 | | 5/2007 | Swift et al. | |
| 2007/0123680 A1 | * | 5/2007 | Swift et al. | 527/312 |
| 2008/0274291 A1 | * | 11/2008 | Shooshtari | 427/389.8 |
| 2010/0222463 A1 | * | 9/2010 | Brady et al. | 524/56 |

FOREIGN PATENT DOCUMENTS

| | | |
|---|---|---|
| DE | 10 2004 033561 A1 | 9/2005 |
| EP | 1 510 607 A1 | 3/2005 |
| EP | 2 223 941 A1 | 9/2010 |
| GB | 2 451 719 A | 2/2009 |

\* cited by examiner

*Primary Examiner* — Allison Fitzsimmons
(74) *Attorney, Agent, or Firm* — Robert D. Touslee

(57) ABSTRACT

Provided are nonwoven polymeric fiber webs using an improved curable composition. Such curable composition comprises an aldehyde or ketone and an amine salt of an inorganic acid. The composition when applied to polymeric fibers is cured to form a water-insoluble polymer binder which exhibits good adhesion and thermodimensional stability.

11 Claims, 1 Drawing Sheet

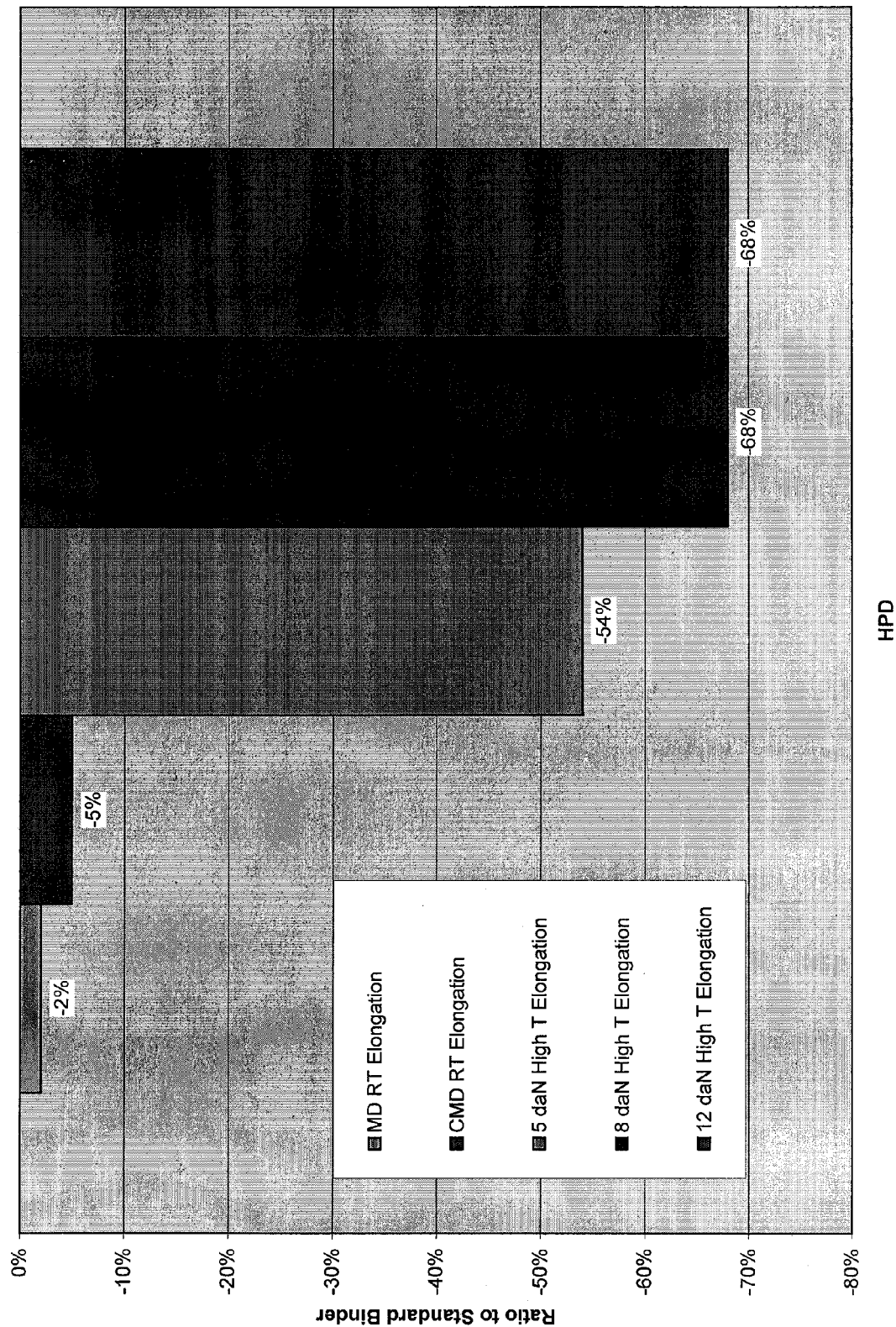

POLYMERIC FIBER WEBS WITH BINDER COMPRISING SALT OF INORGANIC ACID

BACKGROUND

The subject invention pertains to polymeric fiber webs with an improved binding composition and load bearing at elevated temperatures. More specifically, the invention pertains to non-woven polymeric fiber webs using an improved curable composition comprising an amine salt of an inorganic acid. An aldehyde or ketone is added to the salt to form a composition which upon curing is capable of forming a water-insoluble polymer. Once applied to the polymer fibers, the binding composition is cured.

Nonwoven webs comprised of polymeric fibers have a variety of applications. The applications can range from prepeg laminates; polishing or abrasive pads; separators for alkali battery cells; laminated materials for electrical circuit boards; filters, both for gas and liquids; diapers; towels; wipes; industrial and medical garments; foot covers; sterilization wraps, etc.

In many of the applications, the polymeric fibers of the nonwoven web must exhibit good physical properties such as chemical resistance and heat resistance. The nonwoven web is many times used in a hazardous environment, and therefore demands are placed on its construction. This would include not only the polymeric fibers, but also the binder used in the nonwoven web. Many different binders have been used in the past for nonwoven polymeric fiber webs.

For example, in U.S. Pat. No. 7,026,033, a heat resistant nonwoven web comprised of organic synthetic fibers also uses an organic resin binder. The binder is selected from an epoxy resin, phenol resin, melamine resin, formaldehyde resin and fluropolymer resin.

U.S. Pat. No. 7,534,163 describes a non-woven fabric for a polishing pad used to polish semi-conductors. The fibrous component of the pad can be selected among polyester, polypropylene, polyamide, acrylic, polyethylene and cellulosic materials. The binder used for the pad includes resins of polyurethanes, polyacrylates, polystyrenes, polyamides, polycarbonates and epoxies.

Economies without sacrificing physical properties is always a concern in preparing such non-woven polymeric fiber webs. The industry continuously searches for non-woven polymeric fiber webs that can provide the physical properties needed to achieve the required performance, but which offer an economic advantage.

Accordingly, in one aspect the present invention provides a novel nonwoven polymeric fiber web comprised of a non-phenol-formaldehyde binder.

Another aspect of the invention provides a novel nonwoven polymeric fiber web with a binder which provides advantageous flow properties, the possibility of lower binder usage, the possibility of overall lower energy consumption, increased sustainability of the raw materials utilized in the formation of the binder, considerable reduction in the use of petroleum based ingredients, elimination of process corrosion, elimination of interference in the process by a silicone, and improved overall economics.

Still another aspect of the present invention is to provide a nonwoven polymeric fiber web which uses a suitable binder having improved economics, while also enjoying improved physical properties, including chemical resistance and heat resistance.

These and other aspects of the present invention will become apparent to the skilled artisan upon a review of the following description and the claims appended hereto.

SUMMARY OF THE INVENTION

Provided is a nonwoven web comprised of polymeric fibers. The binder is a curable composition comprising a mixture of an aldehyde or ketone and an amine salt of an inorganic acid. This composition upon curing is capable of forming a water-insoluble polymer.

A process for preparing the nonwoven web of polymeric fibers is also provided, comprising applying to the polymeric fibers a composition as a binder comprising an aldehyde or ketone and an amine salt of an inorganic acid. Thereafter the composition is cured while present on the polymeric fibers to form a water-insoluble polymer.

In a preferred embodiment the resulting non-woven product is a mat. The non-woven product is useful in a roofing membrane. In other embodiments the non-woven product is a filter or separator for alkali battery cells.

BRIEF DESCRIPTION OF THE FIGURE OF THE DRAWING

Machine and cross-machine direction tensile elongation and elevated temperature relative tensile elongation of a HMDA/Phos/Dextrose binder are graphically expressed as a ratio to a standard latex binder system. The MD and CMD tensile elongation tests were conducted at room temperature. The relative tensile elongation tests were conducted at 200° C. and the absolute elongation is determined at tensile loadings of 5, 8, and 12 daN, respectively.

DETAILED DESCRIPTION OF PREFERRED EMBODIMENTS

The polymeric fibers that can be used in preparing the nonwoven webs and products can be any useful synthetic fibers, preferably synthetic organic fibers. The fibers, upon application of the unique binder of the present invention, are formed into a nonwoven web. Such nonwoven webs have numerous applications, such as prepeg laminates; polishing, abrasive or cleaning pads; separators for alkali cells; filters for liquids or gases; laminated materials for electrical circuit boards; diapers; wipes; industrial garments; foot covers; sterilization wraps, etc. Of particular application are such nonwoven webs in hazardous environments requiring chemical and high temperature tolerance. The synthetic fibers in combination with the particular binder of the present invention allows one to achieve a nonwoven web that can meet the requirements of all the foregoing applications.

Among the fibers which can be used to form the nonwoven webs are polyester, polypropylene, polyamide, acrylic, polyethylene, cellulosic, sulfones, polysulfones, polyether ketones, polysiloxanes, polybutylene, halogenated polymers such as polyvinyl chloride, polyaramids, melamine and melamine derivatives, polyurethanes, copolymers thereof and combinations thereof. Bicomponent fibers can be used, wherein the core and sheath materials may be different from one another, or in a side-by-side configuration. The non-woven webs can be formed by applying a binder to the fibers using conventional techniques. However, a particular binder is employed in preparing the nonwoven webs of the present invention.

The binder of the present invention which is employed to prepare the nonwoven web of polymeric fibers is a curable composition comprising an aldehyde or ketone and an amine salt of an inorganic acid.

The salt can be any amine salt of an inorganic acid. This includes ammonium salts and amine-acid salts, which are considered amine salts. Any suitable inorganic acid can be used. The acids can be oxygenated acids or non-oxygenated acids. Examples of suitable oxygenated acids include, but are not limited to, phosphoric acid, pyrophosphoric acid, phosphorus acid, nitric acid, sulfuric acid, sulfurous acid, boric acid, hypochloric acid and chlorate acid. Examples of non-oxygenated acids include, but are not limited to, hydrochloric acid, hydrogen sulfide and phosphine. Phosphoric acid is most preferred.

The salt can be prepared using any conventional technique to create salts of inorganic acids. Ammonium salts of an inorganic acid, e.g., phosphoric acid, is one of the preferred salts. Reacting ammonia with the acid will yield the salt. Amine-acid salts are also preferred, with such salts obtained by reacting the selected amine with the acid in water. This is a very simple and straightforward reaction. The molar ratio of acid functionality to amine functionality can vary, and is generally from 1:25 to 25:1. More preferred is a ratio of from 1:5 to 5:1, with a ratio of about 1:2 to 2:1 being most preferred.

Example of amines include, but are not limited to, aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, acids, ethers and others.

Representative amines that are suitable for use in such an embodiment include 1,2-diethylamine, 1,3-propanediamine, 1,4-butanediamine, 1,5-pentanediamine, 1,6-hexanediamine, α, α-diaminoxylene, diethylenetriamine, triethylenetetramine, tetraethylenepentamine, and mixtures of these. A preferred diamines for use in this embodiment of the invention are 1,4-butanediamine and 1,6-hexanediamine. Natural and synthetic amino acids such as lysine, arginine, histidine, etc can also be used.

To the solution of amine salt of inorganic acid, the carbonyl functional materials can be added, especially an aldehyde or ketone. Due to their higher reactivity, aldehydes are preferred to ketones. The composition comprises the amine salt of an inorganic acid and the aldehyde and/or ketone. Some small amount of reaction does take place within the composition between the components. However, the reaction is completed during the curing step, followed by the cross-linking reaction of curing.

Examples of suitable aldehydes include, but are not limited to, mono- and multifunctional aldehydes including acetaldehyde, hydroxy acetaldehyde, butyraldehyde, acrolein, furfural, glyoxal, glyceraldehyde, glutaraldehyde, polyfurfural, poly acrolein, copolymers of acrolein and others. Reducing mono, di- and polysaccharides such as glucose, maltose, celobiose etc. can be used, with reducing monosaccharides such as glucose being preferred.

Examples of ketones include, but are not limited to, acetone, acetyl acetone, 1,3 dihydroxy acetone, benzil, bonzoin, fructose, etc.

The carbonyl compound, i.e., the aldehyde or ketone, reacts with the amine salt of the inorganic acid. The amount of aldehyde and/or ketone added is generally such that the molar ratio of acid in the amino-amide or ammonium salt intermediate to carbonyl or ketone is from 1:50 to 50:1. A ratio of 1:20 to 20:1 is more preferred, with a ratio of 1:10 to 10:1 being most preferred.

The composition when applied to the polymeric fibers optionally can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

The composition of the present invention can be applied to the polymeric fibers by a variety of techniques. In preferred embodiments these include spraying, spin-curtain coating, and dipping-roll coating. The composition can be applied to freshly-formed polymeric fibers, or to the polymeric fibers following collection. Water or other solvents can be removed by heating.

Thereafter the composition undergoes curing wherein a strong binder is formed which exhibits good adhesion to the polymeric fibers. Such curing can be conducted by heating. Elevated curing temperatures on the order of 100 to 300° C. generally are acceptable, but below the melting temperature of the polymeric fibers. Satisfactory curing results are achieved by heating in an air oven at 200° C. for approximately 20 minutes.

The cured binder at the conclusion of the curing step commonly is present as a secure coating in a concentration of approximately 0.5 to 50 percent by weight of the polymeric fibers, and most preferably in a concentration of approximately 1 to 25 percent by weight of the polymeric fibers.

The present invention provides a formaldehyde-free route to form a securely bound formaldehyde-free product. The binder composition of the present invention provides advantageous flow properties, the elimination of required pH modifiers such as sulfuric acid and caustic, and improved overall economics and safety. The binder also has the advantages of being stronger and offering lower amounts of relative volatile organic content during curing, which ensures a safer work place and environment. The cure time of the binder is also faster and therefore does favor the economics while reducing the energy consumption during the curing process and lowering the carbon footprint. The binder also contains high level of sustainable raw materials further reducing the dependency to fossil based sources for the resin. Due to the hydrophobic nature of the present invention, the need for a water repellant such as silicones is eliminated or greatly reduced.

The non-woven products can be used in many different applications. Use for example in a roofing membrane is preferable as good tensile and elongation is observed. Use as a filter or a separator in battery cells are also useful applications.

The following examples are presented to provide specific examples of the present invention. In each instance the thin glass plate substrate that receives the coating can be replaced by synthetic organic fibers. By applying the binder in the examples to polymeric fibers, an improved nonwoven web comprised of polymeric fibers can be achieved. It should be understood, however, that the invention is not limited to the specific details set forth in the Examples.

Formation of Amine Salt of Inorganic Acid Intermediates:

To 1160 g of HMDA dissolved in 2140 g water, 980 g phosphoric acid was added slowly and the solution was stirred for 10 min. The intermediate was labeled HP1/1.

Another intermediate was formed by dissolving 1160 g of HMDA in 3120 g water. Next, 1960 g phosphoric acid was added slowly and the solution was stirred for 10 min. This intermediate solution was labeled HP1/2. The opaque amino-acid salt solution was utilized in the formation of binder.

These intermediates were utilized to make the following resins with glucose.

Example 1

To 42.8 g of solution of HP1/1 intermediate, anhydrous dextrose and water was added. The mass of added water was chosen to be equal to that of corresponding dextrose. The mass of dextrose (and corresponding water) used was 72 g, 108 g, 144 g. 180 g, 216 g, 252 g, 288, 324, 360 g and 396 g. The various solutions were stirred at ambient temperature for 10 min. The solutions were applied as a thin film on glass and Al panel, dried in an oven at 100° C. for 5 min and cured at 200° C. for 20 min. Each solution gave a cured brown polymer that was hard and insoluble in water and solvents.

Example 2

To 62.4 g of solution of HP1/2 intermediate, anhydrous dextrose and water was added. The mass of added water was chosen to be equal to that of corresponding dextrose. The mass of dextrose (and corresponding water) used was 72 g, 108 g, 144 g. 180 g, 216 g, 252 g, 288, 324, 360 g and 396 g. The various solutions were stirred at ambient temperature for 10 min. The solutions were applied as a thin film on glass and Al panel, dried in an oven at 100° C. for 5 min and cured at 200° C. for 20 min. Each solution gave a cured brown polymer that was hard and insoluble in water and solvents.

Example 3

Examples 1-2 were repeated in the presence of 5% by weight ammonium sulfate. The polymers became insoluble in water in less than 10 min.

Example 4

In a non-limiting example, a dextrose-based binder was applied to spunbond mat for evaluation of physical properties. The binder has a composition of hexamethylenediamine/phosphoric acid/dextrose (HMDA/Phos/Dextrose) in which the molar equivalent ratios between each component are 1/2/12. The binder was diluted with tap water and applied to a spunbond mat via a dip-and-squeeze coating application. The coated mat was dried and cured in a standard convection oven set at 215° C.

The spunbond mat tensile and trap tear strengths were measured in both the machine and cross-machine directions at room temperature using a standard Instron. The binder system yielded comparable tensile strength and improved tear strength in comparison to a standard latex binder system.

The elongation of these spunbond mats were also measured at both room temperature and elevated (200° C.) temperature. The results are graphically depicted in the Figure of the Drawing. In the room temperature test, % tensile elongation in both the machine and cross-machine directions is determined at the maximum tensile loading. The elevated temperature % tensile elongation is determined at tensile loadings of 5, 8, and 12 daN, respectively. The binder system yielded 50-60% improvement in tensile elongation at elevated temperature while providing comparable tensile elongation at room temperature in comparison to a standard latex binder system. The overall performance of the binder is superior to any commercially available thermoplastic latex or formaldehyde-free thermosetting binder system and has the added advantage of being primarily derived from renewable raw materials.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

That which is claimed is:

1. A non-woven web of polymeric fibers comprising a water-insoluble binder comprised of a reaction product of a reducing sugar with an amine salt of an inorganic acid formed from an oxygenated acid as the inorganic acid selected from the group consisting of phosphoric acid, pvrophosphorie acid, phosphorus acid, sulfuric acid, sulfurous acid, nitric acid, boric acid, hypochloric acid, and chlorate acid or a non-oxygenated acid as the inorganic acid selected from the group consisting of hydrochloric acid, hydrogen sulfide, and phosphine, wherein the amine is 1,4 butanediamine or 1,6 hexanediamine.

2. The non-woven web of claim 1, wherein the amine salt of of an inorganic acid is an ammonium salt.

3. The non-woven web of claim 1, wherein the inorganic acid is phosphoric acid.

4. The non-woven web of claim 2, wherein the amine salt of an inorganic acid is an ammonium salt of phosphoric acid.

5. The non-woven web of claim 1, wherein the inorganic acid is an oxygenated acid selected from the group consisting of phosphoric acid, pyrophosphoric acid, and phosphorus acid.

6. The non-woven web of claim 1, wherein the inorganic acid is phosphine.

7. The non-woven web of claim 1, wherein the reducing sugar is a reducing monosaccharide, disaccharide or polysaccharide.

8. The non-woven web of claim 7, wherein the reducing sugar is glucose.

9. The non-woven web of claim of 1, wherein the web is a filter.

10. The non-woven web of claim of 1, wherein the web is a filter battery separator.

11. The non-woven web of claim of 1, wherein the web is included in a roofing membrane.

* * * * *

UNITED STATES PATENT AND TRADEMARK OFFICE
CERTIFICATE OF CORRECTION

| | |
|---|---|
| PATENT NO. | : 8,708,162 B2 |
| APPLICATION NO. | : 12/543607 |
| DATED | : April 29, 2014 |
| INVENTOR(S) | : Kiarash Alavi Shooshtari, James Patrick Hamilton and Jawed Asrar |

It is certified that error appears in the above-identified patent and that said Letters Patent is hereby corrected as shown below:

In the Claims

Column 6, line 22, "pvrophosphorie" should read --pyrophosphoric--.

Signed and Sealed this
Eighth Day of July, 2014

Michelle K. Lee
*Deputy Director of the United States Patent and Trademark Office*